United States Patent
Claussen et al.

(10) Patent No.: US 9,602,781 B2
(45) Date of Patent: Mar. 21, 2017

(54) METHODS FOR DEBLENDING OF SEISMIC SHOT GATHERS

(75) Inventors: Heiko Claussen, Plainsboro, NJ (US); Ti-chiun Chang, Princeton Junction, NJ (US); Justinian Rosca, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 453 days.

(21) Appl. No.: 14/112,502

(22) PCT Filed: Mar. 21, 2012

(86) PCT No.: PCT/US2012/029852
§ 371 (c)(1),
(2), (4) Date: Oct. 17, 2013

(87) PCT Pub. No.: WO2012/145113
PCT Pub. Date: Oct. 26, 2012

(65) Prior Publication Data
US 2014/0036060 A1    Feb. 6, 2014

Related U.S. Application Data

(60) Provisional application No. 61/476,530, filed on Apr. 18, 2011.

(51) Int. Cl.
*H04N 9/47*    (2006.01)
*H04N 7/18*    (2006.01)
(Continued)

(52) U.S. Cl.
CPC .............. *H04N 7/18* (2013.01); *G01V 1/003* (2013.01); *G01V 1/36* (2013.01)

(58) Field of Classification Search
CPC ............... E21B 47/0002; H04N 7/185; H04N 2005/2255; G03B 37/005; F02K 9/24
(Continued)

(56) References Cited

U.S. PATENT DOCUMENTS

2002/0120429 A1*  8/2002  Ortoleva .............. E21B 41/0064
                                                              703/2
2005/0128874 A1*  6/2005  Herkenhoff ............ G01V 1/003
                                                              367/56
(Continued)

FOREIGN PATENT DOCUMENTS

WO    2009131619    10/2009

OTHER PUBLICATIONS

International Search Report and Written Opinion in PCT/US2012/029852, dated Sep. 19, 2012, 23 pages.
(Continued)

*Primary Examiner* — William C Vaughn, Jr.
*Assistant Examiner* — Daniel Tekle

(57) ABSTRACT

A system and methods to deblend seismic data from a plurality of sources and received by a plurality of sensors as shot gathers are disclosed. The deblending is performed by a Mutual Interdependence Analysis Method to separate contributions of different shots. Deblending is also performed by applying a measure of coherence in parallel data domains such as Common Shot Gather and Common Midpoint. Deblending is also achieved by using the hyperbolic nature of seismic data in the common midpoint domain. Deblended signals are estimated and are applied to create a seismic image. Also, Bergman iteration based migration is applied directly on the blended seismic shot gathers without first deblending as an alternative method. The methods are applied in seismic imaging for exploration of natural resources.

20 Claims, 9 Drawing Sheets

(51) Int. Cl.
*G01V 1/00* (2006.01)
*G01V 1/36* (2006.01)

(58) Field of Classification Search
USPC .......................................................... 348/85
See application file for complete search history.

(56) References Cited

U.S. PATENT DOCUMENTS

| | | |
|---|---|---|
| 2006/0171591 A1 | 8/2006 | Chang et al. |
| 2007/0110290 A1 | 5/2007 | Chang et al. |
| 2008/0107319 A1 | 5/2008 | Chang et al. |
| 2010/0103772 A1 | 4/2010 | Eick et al. |

OTHER PUBLICATIONS

Heiko Claussen et al., "Signature Extraction Using Mutual Interdependencies", Pattern Recognition, Elsevier, pp. 650-661, vol. 44, 2011.

Berkhout et al.: "Changing the mindset in seismic data acquisition", The Leading Edge, vol. 27, No. 7, pp. 924-938, Jul. 2008.

H. Claussen et al.: "Mutual Interdependence Analysis (MIA)", Independent Component Analysis and Blind Signal Separation, Springer-Verlag, Heidelberg, Germany, pp. 446-453, 2007.

H. Claussen et al.: "Mutual features for robust identification and verification", International Conference on Acoustics, Speech and Signal Processing, Las Vegas, NV, pp. 1849-1852, 2008.

H. Claussen et al.: "Generalized mutual interdependence analysis", International Conference on Acoustics, Speech and Signal Processing, Taipei, Taiwan, pp. 3317-3320, 2009.

P. Akerberg.: "Simultaneous source separation by sparse Radon transform", 78th Annual International Meeting, SEG, pp. 2801-2805, 2008.

S. Huo et al: "Simultaneous sources separation via multi-directional vector-median filter", 79th Annual International Meeting, SEG, pp. 31-34, 2009.

G. Hampson et al.: "Acquisition using simultaneous sources", The Leading Edge, vol. 27, No. 7, pp. 918-023, 2008.

S. Spitz et al.: "Simultaneous source separation: a prediction-subtraction approach", 78th Annual International Meeting, SEG, pp. 2811-2815, 2008.

\* cited by examiner

X : currently evaluated point
I : left neighbor in CMP#2 domain
O : right neighbor in CMP#2 domain

METHODS FOR DEBLENDING OF SEISMIC SHOT GATHERS

CROSS REFERENCE TO RELATED APPLICATIONS

The present application is a §371 nationalization of PCT Application No. PCT/US2012/029852, filed Mar. 21, 2012, and designating the United States, which, in turn, claimed the benefit of U.S. Provisional Patent Application Ser. No. 61/476,530, filed on Apr. 18, 2011, the entire disclosures of which are incorporated by reference herein.

BACKGROUND

The present embodiments relate to deblending of blended data.

Conventional seismic surveys require that the time interval between two source shots (e.g., dynamite or vibrators on land, and air guns in marine survey) is sufficiently long to avoid interference between these shots. This makes seismic data acquisition time consuming. To reduce survey time, the number of shots is restricted to an acceptable minimum. The spatial domain, however, is poorly sampled.

Simultaneous sources/blended acquisition refers to having a plurality of sources in a single shot gather. Such a data acquisition scheme may reduce time in field surveys and efficiently provide versatile illumination and dense sampling geometry, thus offering cost saving and better seismic image quality.

Methods to deblend blended data may lead to unsatisfactory results if source interference is not adequately removed or diminished.

Accordingly, new and improved methods and systems to deblend blended data are to be provided.

SUMMARY AND DESCRIPTION

The scope of the present invention is defined solely by the appended claims and is not affected to any degree by the statements within this summary.

In accordance with an aspect of the present embodiments, methods and systems are provided to deblend blended seismic data in shot gathers. In accordance with an aspect of the present embodiments, a method for deblending seismic data includes acquiring blended seismic data by a processor in a plurality of recordings from a plurality of sensors. Each sensor of the plurality of sensors generates a plurality of blended signals generated by a plurality of semi-simultaneously fired sources. Each source of the plurality of semi-simultaneously fired sources is fired more than once. The method includes selecting a first source from the plurality of semi-simultaneous sources and a plurality of blended signals received by a first sensor. The processor arranges recordings of the plurality of blended signals acquired by the first sensor to align with a timing of the first source. The processor applies Mutual Interdependence Analysis (MIA) to estimate from at least two aligned blended signals a deblended signal received at the first sensor that is attributed to the first source.

In accordance with a further aspect of the present embodiments, the method includes arranging recordings of a plurality of blended signals acquired by a second sensor to align with the timing of the first source.

In accordance with yet a further aspect of the present embodiments, the method includes arranging recordings of a plurality of blended signals acquired by the first sensor to align with a timing of a second source.

In accordance with yet a further aspect of the present embodiments, the method includes generating a seismic image based on the estimated deblended signal.

In accordance with yet a further aspect of the present embodiments a method is provided, in which the method is applied in oil exploration.

In accordance with yet a further aspect of the present embodiments, the method is applied in gas exploration.

In accordance with yet a further aspect of the present embodiments, the applying of the Mutual Interdependence Analysis involves an evaluating of an expression:

$$\hat{s}_{n,m} = X_m \cdot (X_m^T \cdot X_m)^{-1} \cdot r_{n,m},$$

with $$X_m = \lfloor x_{1,m}, x_{2,m}, \ldots, x_{E,m} \rfloor$$

and $$r_{n,m}(e) = \begin{cases} 1 & \text{if } x_m = \sum_{i=1}^{N} \alpha_i \cdot s_i \text{ and } \alpha_n = 1 \\ 0 & \text{else} \end{cases}$$

where
$\hat{s}_{n,m}$ is estimated deblended data from source n at sensor m;
$X_m$ is a collection of recordings at sensor m from all experiments;
$r_{n,m}(e)$ is a vector that indicates which of the experiments contain the aligned target source e;
n indicates a source;
m indicates a sensor;
$\alpha_i$ is a weight of a single shot recording i in a recording of the currently analyzed sensor $x_m$; and
$s_i$ is a single shot recording of shot location i.

In accordance with an aspect of the present embodiments, a method for deblending blended seismic data, includes acquiring, by a processor, blended seismic data in a plurality of recordings from a plurality of sensors. Each sensor of the plurality of sensors receives a blended signal generated by at least a first semi-simultaneous source and a second semi-simultaneous source, and the processor records a plurality of datapoints. Each datapoint of the plurality of datapoints is associated with a specific sensor at a specific time. The method also includes arranging each datapoint of the plurality of datapoints in a plurality of transformed recordings in accordance with a timing and a location of each source of the plurality of sources in at least one transform domain. The method includes selecting, by the processor, a datapoint associated with a first time at a first sensor. The processor determines an energy histogram, as a result of the first semi-simultaneous source, of a plurality of datapoints that neighbor the selected datapoint in the at least one transform domain. The processor determines an energy histogram of a plurality of datapoints that neighbor the selected datapoint in the at least one transform domain as a result of the second semi-simultaneous source. The processor estimates an energy contribution of the first semi-simultaneous source to the selected datapoint relative to the second semi-simultaneous source.

In accordance with another aspect of the present embodiments, The method includes estimating an energy contribution of the first semi-simultaneous source at the selected datapoint relative to all contributing semi-simultaneous sources.

In accordance with yet another aspect of the present embodiments, the method includes selecting at least one datapoint in a neighborhood of the selected datapoint in at least one transform domain to determine an energy contribution of the first semi-simultaneous source to the selected datapoint relative to the second semi-simultaneous source.

In accordance with yet another aspect of the present embodiments, the method includes estimating an energy contribution of the first semi-simultaneous source to each datapoint of a plurality of datapoints associated with the plurality of sensors relative to all contributing semi-simultaneous sources.

In accordance with yet another aspect of the present embodiments, the method includes displaying estimated energy contribution of the first semi-simultaneous source to each datapoint of a plurality of datapoints associated with the first sensor as deblended datapoints.

In accordance with yet another aspect of the present embodiments, the method includes an energy contribution of the first semi-simultaneous source and the second semi-simultaneous source is defined by a probability constraint.

In accordance with yet another aspect of the present embodiments, the method includes arranging each datapoint of the plurality of datapoints in a plurality of transformed recordings in accordance with a timing and a location of each source of the plurality of sources in at least one additional transform domain.

In one embodiment, a transform domain is selected from the group consisting of Common Shot Gather, Common Mid Point Gather, Common Offset Gather and Common Detector Gather.

In one embodiment, the method is applied in exploration for natural resources.

In accordance with an aspect of the present embodiments, a method for deblending blended seismic data includes acquiring data, by a processor, of a blended seismic data in a plurality of recordings from a plurality of sensors. Each sensor of the plurality of sensors receives a blended signal generated by a plurality of semi-simultaneous sources. The processor arranges a recording related to a first sensor in a Common Midpoint (CMP) domain representation. The processor detects an edge in the CMP domain representation by applying a second moment eigen analysis followed by thresholding. The processor parameterizes the edge by hyperbolic equation fitting. The processor estimates a deblended signal received at the first sensor that is attributed to the first source based on a measure of hyperbolic equation fitting of the edge.

In one embodiment, the estimated deblended signal is created by removing data determined not to fit a hyperbolic equation.

In accordance with yet a further aspect of the present embodiments, the method includes the processor generating a seismic image based on the estimated deblended signal.

In accordance with yet a further aspect of the present embodiments, the method is applied in exploration for natural resources.

In accordance with an aspect of the present embodiments, a method to create a seismic image from semi-simultaneous sources includes generating a first plurality of semi-simultaneously generated signals by a first plurality of seismic sources, receiving the first plurality of semi-simultaneously generated signals by each sensor of a plurality of sensors, and applying, with a processor, an objective function that predicts a measurement by a sensor in the plurality of sensors. The objective function is provided with a sparsity regularization. The processor minimizes the objective function in an iterative manner against an actual measurement by the sensor, and the processor generates the seismic image.

DESCRIPTION OF PREFERRED EMBODIMENTS

Figure 1:
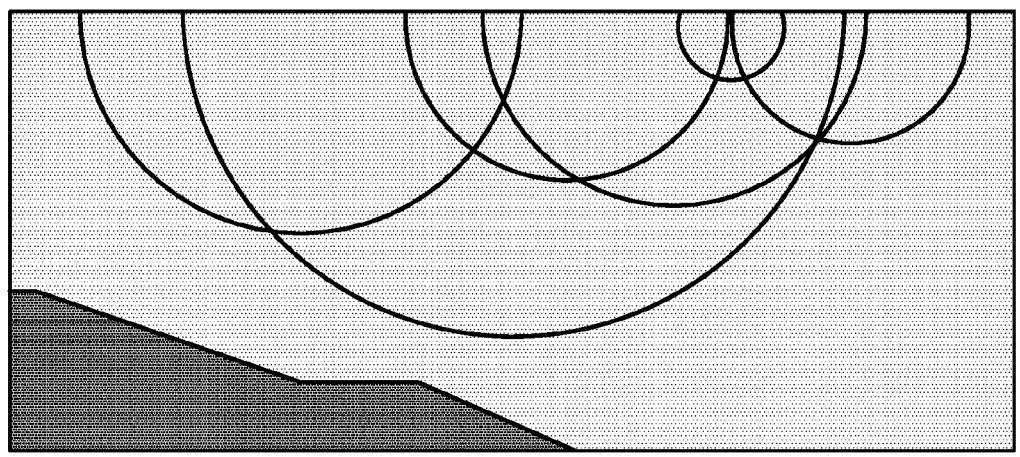
FIG. 1 illustrates a snapshot of an exemplary blended source wave field.

Simultaneous sources/blended acquisition refers to several sources in a single shot gather. This data acquisition scheme may reduce time in field surveys and efficiently provide versatile illumination and dense sampling geometry, thus offering cost saving and better seismic image quality. A snapshot illustrating the blended source wave field is shown in FIG. 1. Specifically, the measured data may be expressed as a M×E×T matrix $P_b$, where M, E, and T denote, respectively, the number of receivers, the number of experiments (e.g., shot records), and the sample numbers in a trace. Using a blending matrix $\Gamma$ to model the blending operation of different sources for each trace sample, the unblended data matrix P is related to $P_b$ by:

$$P_b(\bullet,\bullet,t)=P(\bullet,\bullet,t)\Gamma. \quad (1)$$

Equation (1) states that the blended data is a linear combination of each isolated shot, possibly with random delay among different shots. For a fixed trace sample t, each row and column of $P_b$ represents, respectively, a receiver gather and a shot record. FIG. 1 shows a snapshot of a blended source wave field. Each semi-circle is a wave field from a single shot.

The present embodiments may be directed to creating high quality seismic images from the observed data $P_b$. A straightforward approach directly applies the conventional migration methods, the presumed inputs of which are P rather than $P_b$, to obtain the seismic image. Conventional processing does not account for the interfering nature of the blended data. Therefore, the results of this simple approach may not be satisfactory. If P from Equation (1) may be estimated, the source interference is removed. Then, the conventional methods may be applied to improve the results. The estimation of P is referred to as deblending. Three methods are provided below in accordance with one or more aspects of the present embodiments to deblend $P_b$.

In most cases, the number of experiments E is much smaller than the number of different sources N, making Equation (1) highly underdetermined. Solving Equation (1) for P is ill-posed. The model information in the source domain is difficult to exploit. Therefore, rather than trying to deblend $P_b$, the optimal image (in the sense of a certain metric, such as least square) of the subsurface model m that, after forward modeling of wave propagation L, satisfies the data fidelity $$P_b \approx Lm$$

may be sought directly.

To solve for m, metric-based migration may be employed directly from the blended sources, with model regularization in the image domain. This approach is further expanded below.

In accordance with different embodiments, at least four novel approaches to handle seismic data with simultaneous sources are provided. First, a mutual interdependence analysis (MIA) approach is provided to extract the signal of interest based on the concept of equal correlation. Different from the filtering based local processing, the correlation of each shot among different experiments is calculated. The shot separation may then be achieved as described further below.

Second, the idea of enforcing coherence in both the common midpoint domain (CMP) and common shot gather (CSG) is introduced and may be used in accordance with an aspect of the present embodiments. CMP domain coherence is estimated via filtering based approaches. A mask indicating the signal contribution from different shots is generated and transferred to the CSG domain as an initial estimate that is subsequently refined through the CSG domain coherence measure. This process is further described below. Other ways of performing this task are described later as well.

Thirdly, a hyperbola fitting method based on local image analysis is provided. A feature vector generated from a second moment matrix is associated with each pixel. In the CMP domain, these features are used to find the hyperbola that best fit the data, thus separating non-coherent signals. This process is further explained in a section below.

A fourth approach, as formulated in a section below, aims directly at the seismic images without specific deblending. Preconditioned iterative migration that is cast as an optimization problem and takes advantage of the model information is employed. Bregman iteration is applied to solve the associated cost functional and to preserve weak signals. The preconditioner is implemented as a high pass filter and enables fast convergence of the iterations. The solution provided in accordance with an aspect of the present embodiments makes the iterative scheme computationally practical and achieves better image quality.

MIA Based Deblending of Seismic Shot Gathers

In the following section, a deblending approach of seismic shot gathers in accordance with an aspect of the present embodiments is further described. It is assumed that each blended shot gather may be modeled as an additive combination of N single shot recordings. Furthermore, each single shot recording is assumed to be present in multiple experiments. It is the intuition that this mutually present component is equally correlated with itself between experiments but uncorrelated to other shot recordings in the blended shot gathers. In the following, mutual interdependence analysis is described, along with the background of the extraction of such mutual components and how this method is applied to the seismic domain.

Background of Mutual Independence Analysis

In previous work—Claussen, H., Rosca, J., Damper, R., "Generalized mutual interdependence analysis," International Conference on Acoustics, Speech and Signal Processing, Taipei, Taiwan, 2009, pp. 3317-3320; Claussen, H., Rosca, J., Damper, R., "Mutual features for robust identification and verification," International Conference on Acoustics, Speech and Signal Processing, Las Vegas, Nev., 2008, pp. 1849-1852; and Claussen, H., Rosca, J., Damper, R., "Mutual interdependence analysis," Independent Component Analysis and Blind Signal Separation, Springer-Verlag, Heidelberg, Germany, 2007, pp. 446-453, the entire disclosures of which are incorporated by reference—mutual interdependence analysis (MIA) has been developed and successfully used to extract complex representations, or mutual "features", accounting for samples in the class. A mutual feature is a linear regression that is equally correlated with all samples of the input class. MIA and the corresponding generalization (GMIA) have been shown to be related to statistical techniques such as canonical correlation analysis and Bayesian estimation. While common statistical signal processing approaches assume the number of inputs M to be much larger than their dimensionality D, MIA assumes M<D linearly independent inputs. "Mutual faces" extracted from the Yale database are illumination invariant and obtain identification error rates of 7.4% in exhaustive leave-one-out tests. Also, "mutual speaker signatures" for text independent speaker verification achieve state-of-the-art equal error rates of 6.0% on the NTIMIT database. The effectiveness of the GMIA approach and the difference of GMIA to ubiquitous signal processing methods, such as principal and independent component analysis, is exemplified in FIG. 2 on artificial data.

Figure 2:
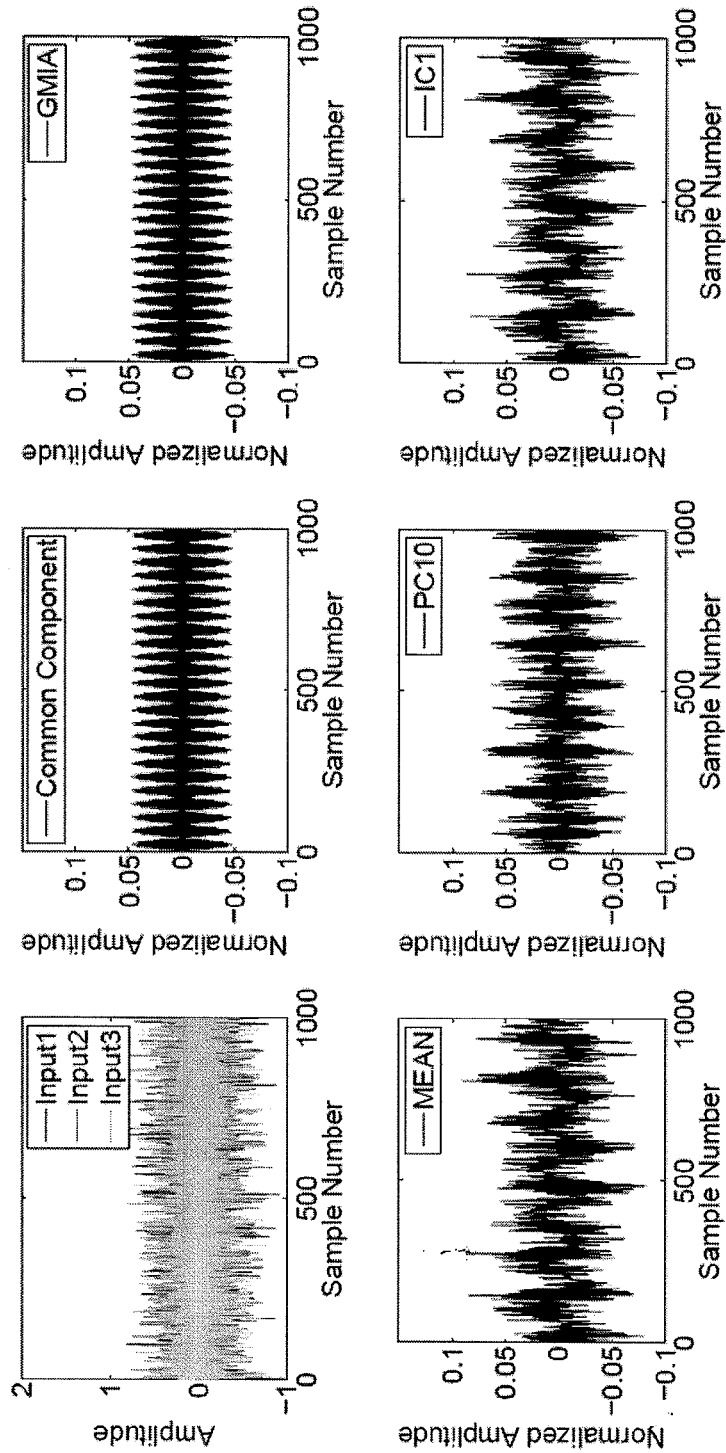
FIG. 2 illustrates a blended signal and a component obtained by deblending in accordance with an aspect of the present embodiments.

FIG. 2 illustrates a comparison of results using various ubiquitous signal processing methods. The top left plot shows, for simplicity, an overlay of the first three of 20 inputs that are all mixtures of a common component (top middle plot) and other interfering sources. The bottom plots show components obtained in an attempt to extract the common component, using the mean, principal component analysis (PCA) and independent component analysis (ICA). The components outlined for PCA and ICA are components that maximally correlate with the common component. The GMIA solution turns out to accurately represent the common component, as the solution is maximally correlated to the common component.

Below, it is shown that MIA may be used to separate contributions of a single source from multi-experiment multi-shot seismic data. This may be a useful preprocessing step or act for exploiting blended shot data in a traditional seismic data analysis workflow.

MIA-Based Deblending Approach

In the following, it is shown how MIA may be used to deblend seismic shot recordings. Assume that each source $s_n$ with n=1 . . . N is fired more than once, across a total number of experiments E, with equivalent source/receiver locations. The number of experiments is assumed to be much smaller than the number of sources (E<<N). It is assumed that the timings and combinations of sources vary over experiments and are known.

Figure 3:
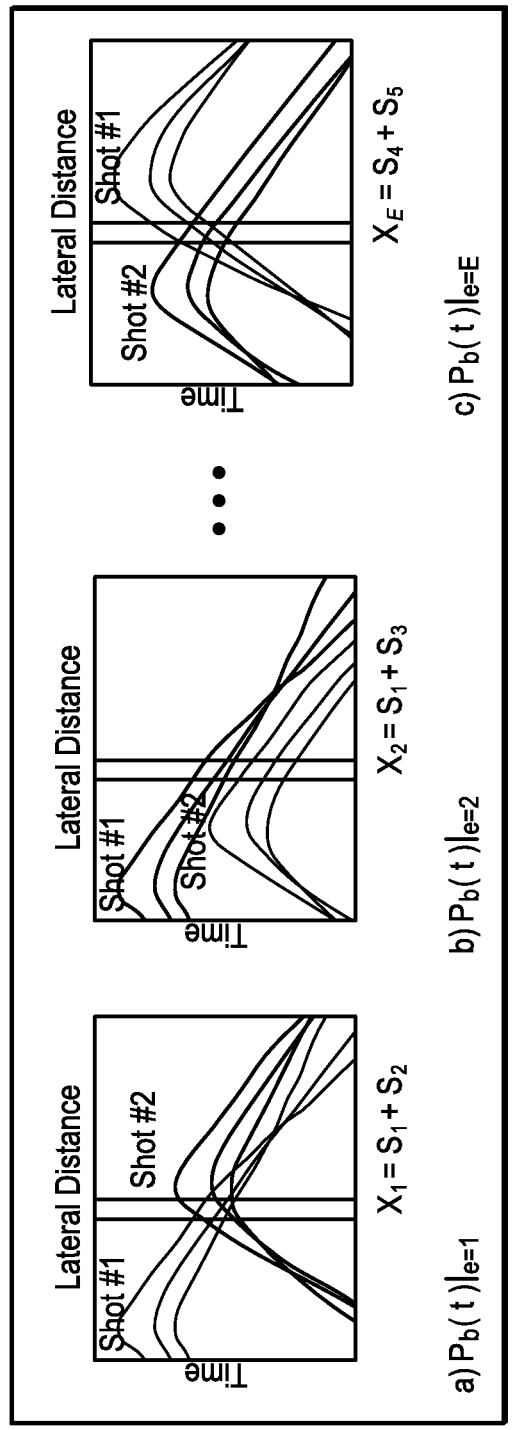
FIG. 3 illustrates exemplary simulated blended shot gathers from different experiments.

The blended common shot gathers $P_b(\omega)$ have been modeled as a linear combination of deblended shot gathers $P(\omega)$ with a blending operator $\Gamma_{n,e}(\omega) = e^{-j\alpha(e,\omega)}|_{1\ldots N, e=1\ldots E}$ accounting for the shot combination and timings in each experiment. See Berkhout, A. J., "Changing the mindset in seismic data acquisition," The Leading Edge, v. 27, no. 7, 2008, pp. 924-938, the entire disclosure of which is incorporated herein by reference. An example of the blended common shot gathers in the time domain $P_b(t)$ is illustrated in FIG. 3. Equivalently, each of the M sensor recordings $x_{e,m}|_{e=1\ldots E, m=1\ldots M}$ may be modeled as a linear combination of signals from different sources (e.g., $x_1 = s_1 + s_2$ assuming a first experiment is a linear combination of the shot records from first and second sources).

FIG. 3 illustrates simulated blended shot gathers from different experiments. Each grouped set of curves represents a distinct source. Plot (a) depicts a shot gather of the first experiment in the time domain. The two blended shot records are numbered by their time of arrival. Each column represents the recording of a sensor with a defined lateral position. Plot (b) depicts a shot gather of the second experiment. The shots with same source receiver locations are time aligned. The time difference and shot combinations are random. Plot (c) depicts a shot gather of the last experiment.

The correlation between sensor signals of different experiments may indicate the presence of a common source in FIG. 3:

$$x_{1,m}^T \cdot s_{1,m} \approx x_{2,m}^T \cdot s_{1,m} >> x_{E,m}^T \cdot s_{1,m}$$

Thus, MIA may be used to extract the signal contribution of a common source $s_1$, as follows.

First, a sensor signal and target source are selected for deblending.

Second, the signals of the selected sensor over the experiments are delayed to align the common source contributions. That is, the target source is aligned if present.

Third, MIA is applied to find a linear combination that correlates high with experiments where the target source is present and decorrelates with all others:

$$\hat{s}_{n,m} = X_m \cdot (X_m^T \cdot X_m)^{-1} \cdot r_{n,m},$$

$$X_m = \lfloor x_{1,m}, x_{2,m}, \ldots, x_{E,m} \rfloor$$

$$r_{n,m}(e) = \begin{cases} 1 & \text{if } x_m = \sum_{i=1}^{N} \alpha_i \cdot s_i \text{ and } \alpha_n = 1 \\ 0 & \text{else} \end{cases}$$

Note that in this context, "high correlation" does not necessarily represent a correlation coefficient close to 1. MIA aims to extract the target source signal that does not necessarily have a correlation coefficient close to 1 with the recordings at sensor m, as those are linear combinations of multiple single shot recordings. MIA finds a component that is equally correlated with the experiments where the target signal is present and has a lower correlation with all others.

In the above expression, $\hat{s}_{n,m}$ is the deblended signal from source n at sensor m, and $x_m$ represents the recording of sensor m, which is assumed to be a linear combination of different single shot recordings $s_i$ of shot locations i. The target source is at shot location n. $\alpha_i$ is the weight of the single shot recording i in the recording of the currently analyzed sensor $x_m$. $r_{n,m}$ is a vector that indicates which of the experiments contain the aligned target source, and $X_m$ is the collection of the recordings at sensor m from all experiments.

These three acts are repeated for all sensor/source combinations of interest. Subsequently, specific seismic data processing techniques may be used to refine the results (e.g., based on coherence in the common source gather domain).

The above method is implemented on a processor provided with data related to signals collected by sensors. Timing information on activating the sources is thus applied to deblend and estimate received signals from the sensor signals as being caused by a specific source. These estimated or calculated contributions are then applied in known methods to construct a seismic image. The seismic images created using the above and other methods and systems as provided herein as an aspect of the present embodiments may be used in many aspects of seismic research, including in mapping of seismic or underground land formations, exploration for natural resources including minerals and hydro-carbons such as oil and/or gas, mapping of a seabed or a bottom of a water, mapping of water flows with different physical properties and all other mappings of hidden structures by seismic methods.

CSG/CMP Coherence Based Deblending of Seismic Shot Gathers

Alternatively to MIA, the coherence of shot gathers may be used for deblending. In this section, it is further discussed how coherence is used in the literature to address blended shot gathers. Thereafter, using parallel coherence in different domains for deblending is provided.

Figure 4:
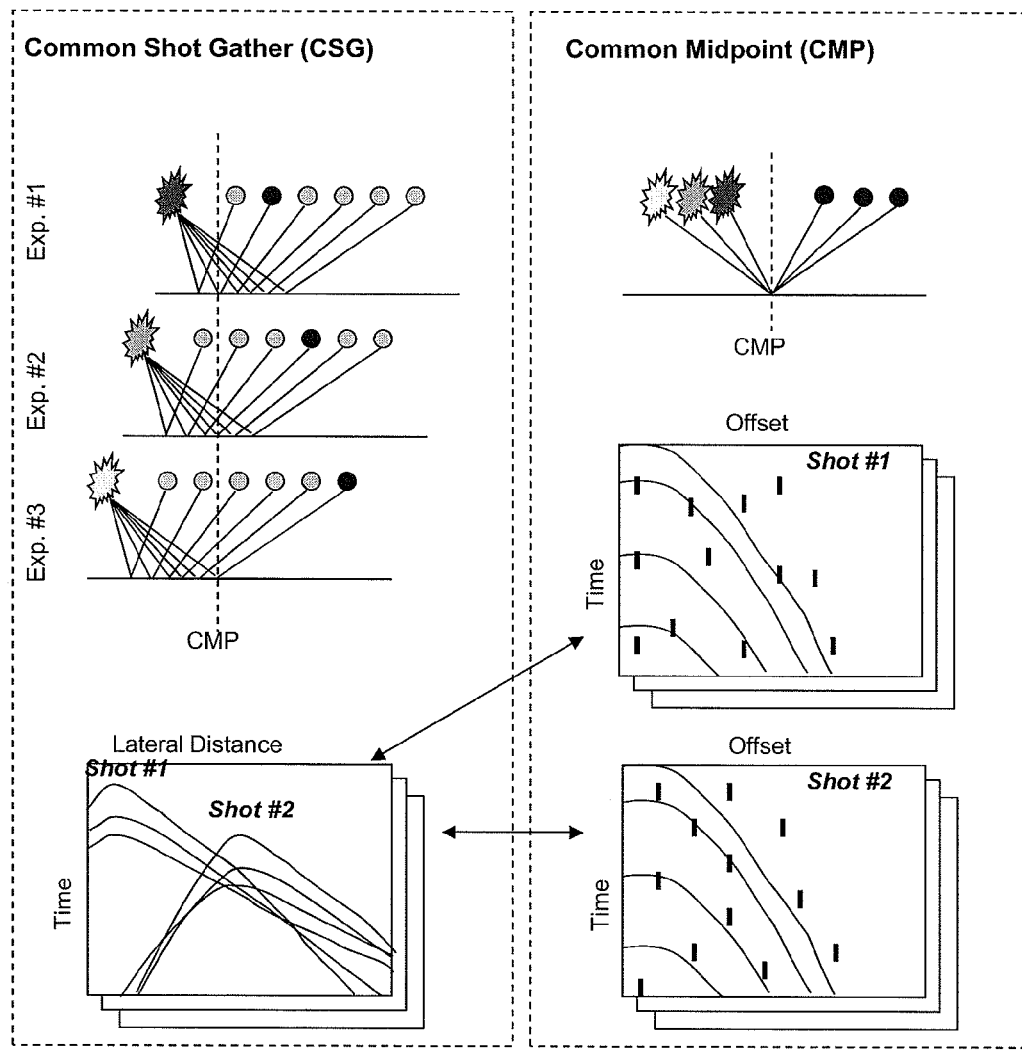
FIG. 4 illustrates simulated coherence based deblending in accordance with an aspect of the present embodiments.

Multi-shot seismic gathers are processed in particular input representations such as the common midpoint (CMP) domain to cancel the between-shot interference (e.g., see Huo, S., Luo, Y., and Kelamis, P., "Simultaneous sources separation via multi-directional vector-median filter," 79th Annual International Meeting, SEG, 2009, pp. 31-34). For example, assume small random delay times between the K sources activated in each of the E experiments. The recorded data is initially available in the common shot gather (CSG) domain illustrated in FIG. 4. FIG. 4 shows a snapshot where only one of the K sources is active. The data is then transferred (e.g., to the CMP domain). Each column represents a sensor signal from possibly different experiments. While the CMP shot/receiver combinations result in a structured and coherent signal, the interfering shots result in non-coherent, random and localized distortions. Therefore, the information about randomness, localization and coherence may be utilized to suppress the interference. Proposed methods separate into stacking and filter/layer-separation based approaches. It was shown that stacking may effectively suppress the random energy (e.g., see Hampson, G., Stefani, J., and Herkenhoff, E. F., "Acquisition using simultaneous sources," The Leading Edge, v. 27, no. 7, 2008, pp. 918-923). However, noise suppression by stacking cancels the possibility to use powerful pre-stack migration approaches. Filter/layer-separation approaches that utilize coherence include Radon transform based methods (e.g., see Akerberg, P., Hampson, G., Rickett, J., Martin, H. and Cole, J., "Simultaneous source separation by sparse radon transform," 78th Annual International Meeting, SEG, 2008, pp. 2801-2805; Spitz, S., Hampson, G., and Pica, A., "Simultaneous source separation: a prediction-subtraction approach," 78th Annual International Meeting, SEG, 2008, pp. 2811-2815) and the vector median filter approach, as described in Huo, S., Luo, Y., and Kelamis, P., "Simultaneous sources separation via multi-directional vector-median filter," 79th Annual International Meeting, SEG, 2008, pp. 31-34. The advantage of these approaches is that the following migration process may adopt the conventional methods to obtain an accurate image for subsequent interpretation.

In the following, it is shown how deblending may be improved by using parallel coherence in different input domains such as the CSG and CMP domains. The approach is illustrated in FIG. 4.

Assume the inputs of the deblending to be common source gathers from E experiments each containing K blended sources.

In a first act, the data is transferred to the CMP domain separately for shots with different arrival times. That is, first, all CSGs are transferred to the CMP domain using the location and timing of the first arriving source. Second, the CSGs are transferred to the CMP domain using the location and timing of the second arriving shot, and so on. In this domain, the interfering shots appear random, as the data comes from multiple experiments with different shot combinations and random timings.

In a second act, the interfering shot contributions are detected using coherence based filtering such as the vector-median filter. This is described in, for example, Huo, S., Luo, Y., and Kelamis, P., "Simultaneous sources separation via multi-directional vector-median filter," 79th Annual International Meeting, SEG, 2009, pp. 31-34, the entire disclosure of which is incorporated herein by reference. These contributions are marked dependent on their respective effect to the overall signal energy. The result of this marking is a map that represents the percentile contribution of each pixel to the signal and interference energy. This approach is performed for all CMP gathers of all K near simultaneous sources.

In a third act, the masks are transferred back to the CSG domain. The masks provide a first estimate for each pixel contribution to the different shots.

In a fourth act, these estimates are refined using the coherence of all shots in the CSG domain. This additional dimension, in which different coherence information may be utilized, may help to improve the accuracy of the deblending result.

To resolve ambiguities, the acts may be iterated, or additional domains may be selected that provide independent coherence measures, such as the common receiver or the common offset domain. In accordance with an aspect of the present embodiments, coherence is determined concurrently in at least two domains. In accordance with a further aspect of the present embodiments, coherence is determined concurrently in at least three domains. Such domains include the Common Shot Gather, Common MidPoint Gather, Common Offset Gather and Common Detector Gather.

FIG. 4 illustrates simulated coherence based deblending that uses parallel coherence in different data representations such as the CSG and CMP domains. The two blended shot records are numbered by their time of arrival. The shots with the same number but from different experiments are transferred to the common midpoint domain. Coherence based filtering is performed, resulting in masks that indicate the amount of energy per pixel that contributes to the interference or coherent structure. These masks are transferred back to the CSG domain, where the masks are refined using coherence.

As stated above, in a first act, the data is transferred to the CMP domain separately for shots with different arrival times. That is, first, all CSGs are transferred to the CMP domain using the location and timing of the first arriving source. Second, the CSGs are transferred to the CMP domain using the location and timing of the second arriving shot and so on. In this domain, the interfering shots appear random, as the data comes from multiple experiments with different shot combinations and random timings.

Figure 5:
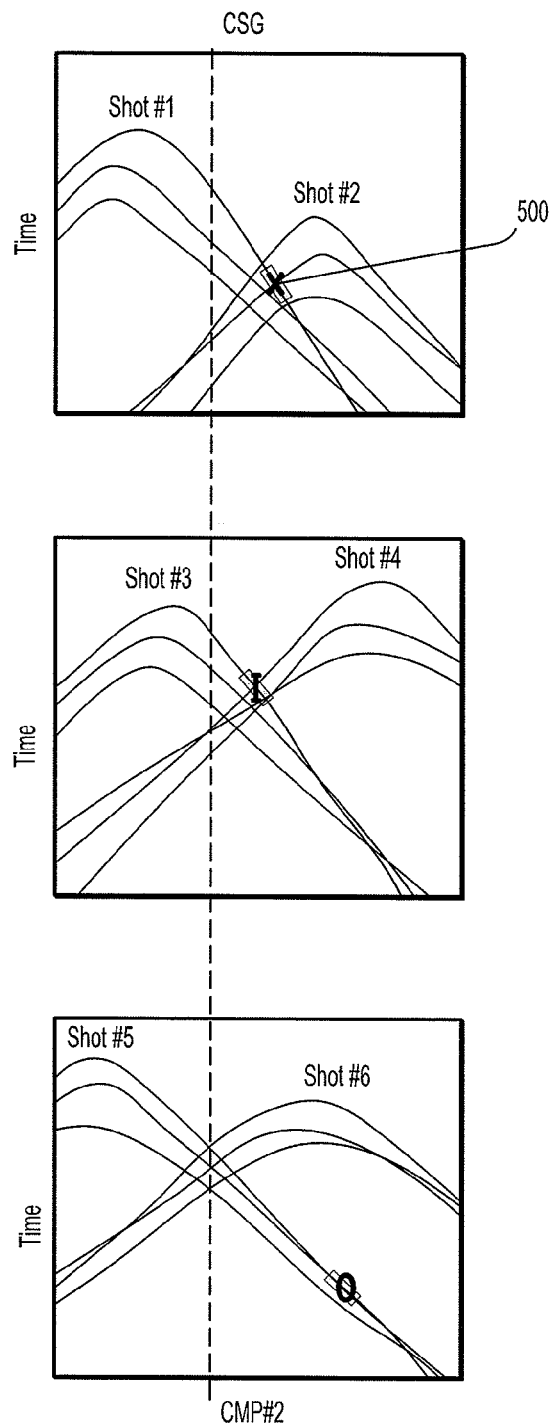
FIG. 5 illustrates datapoints in one domain in accordance with an aspect of the present embodiments.
Figure 6:
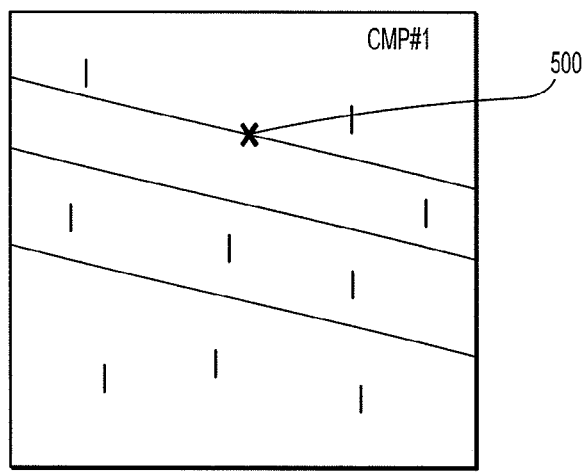
FIG. 6 illustrates datapoints in a transform domain in accordance with an aspect of the present embodiments.
Figure 6:
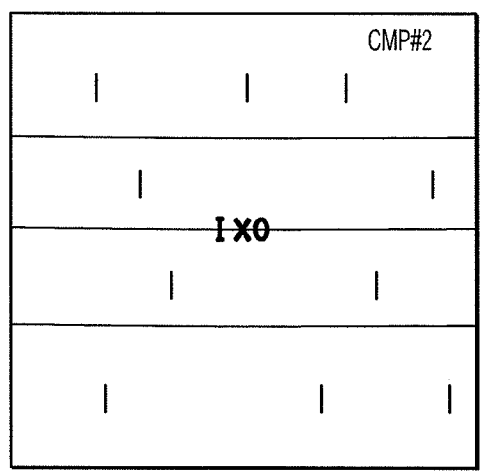

Each column in the CMP gather represents a column from the CSG domain. Therefore, each point in this column may have energy contributions from all shots fired in the respective experiment in the CSG domain. FIGS. 5 and 6 identify an evaluated point x (500). Possible neighbors in a CMP domain are shown in FIG. 6. For example, the currently evaluated point x in FIG. 5 may have energy contributions from shot#1 and shot#2. Point 500 is also identified in FIG. 6 in the CMP domain. The question that the herein provided approach answers is how much energy of the point x is from shot#1, and how much energy is from shot#2? To solve this, the probability of the energy contribution from shot#1 and shot#2 are first estimated separately. This is achieved by computing the histogram of the energies from all neighboring points in all analyzed domains. Such domains include Common Shot Gather, Common Mid Point Gather, Common Offset Gather and Common Detector Gather. Only neighboring points that relate to the physical constraints such as points on the lines of the normal move out preprocessed CMP, on the hyperbolic CSG, etc. are considered. The histograms may include the energies of the neighboring points of the initial neighbors in all domains. In this way, a large number of related energy values are selected for an accurate computation of the histograms. Similar histograms are computed for all shots possibly contributing to the energy in x.

Figure 7:
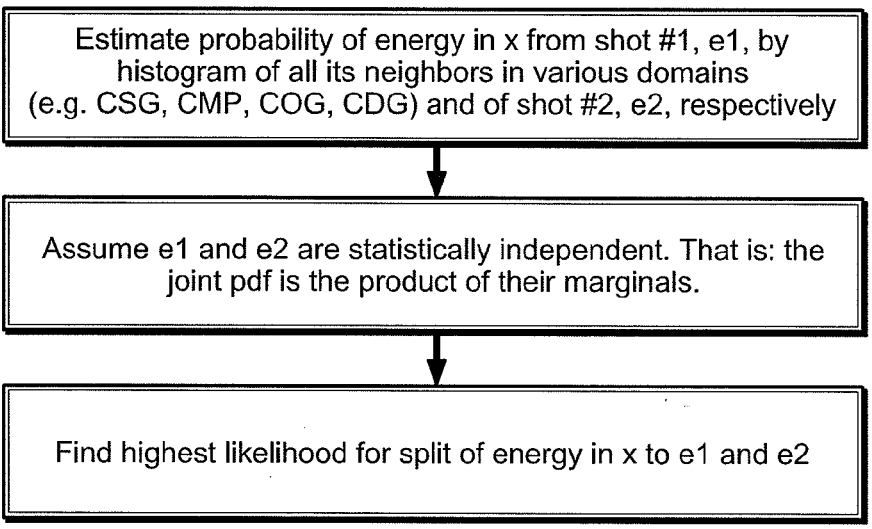
FIG. 7 illustrates acts of a method provided in accordance with an aspect of the present embodiments.
Figure 8:
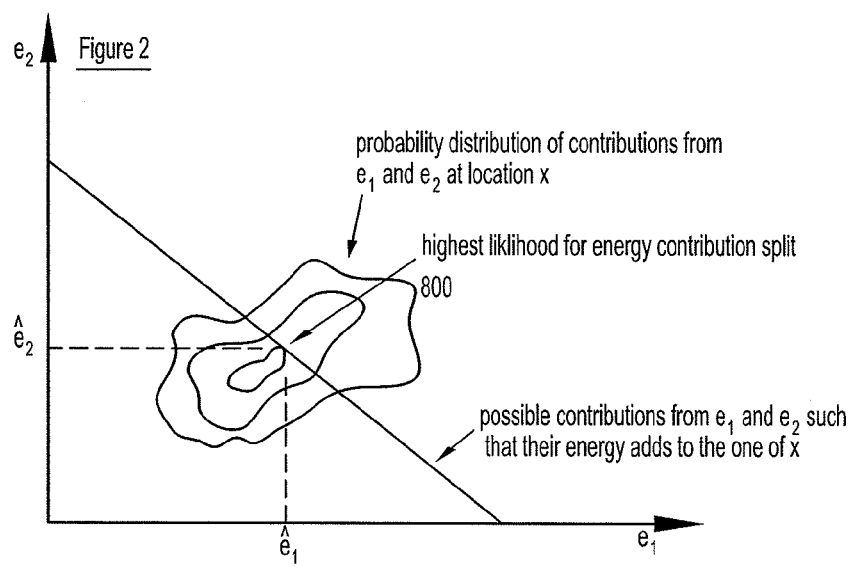
FIG. 8 illustrates a probability distribution in accordance with an aspect of the present embodiments.

It is assumed that the energy contribution of the different shots is statistically independent. Thus, the joint probability of the energy contributions from different shots may be computed by the product of the marginal distributions estimated by the histograms of energies of neighboring points, as discussed above. The joint probability function is illustrated in FIG. 8. Only combination of energy contributions from different shots are possible that add to the total energy at the currently evaluated point x. In the example of two blended shots, this constraint results into a line in the two dimensional energy pdf, as shown in FIG. 8. The point 800 that fits this constraint and has the highest probability value is selected as the most likely split of the energies from different shots. FIG. 7 illustrates the acts of this approach.

The procedure from FIG. 7 is repeated for all data points. Thereafter, one may display exclusively the energy contributions from one of the sources and thus show the deblended result.

As an aspect of the present embodiments, a neighborhood of datapoints to a first datapoint is defined herein below. The above procedure and method in one embodiment is performed for a neighborhood of a first datapoint, which includes datapoints that are not directly neighboring the first datapoint.

One advantage of this deblending method in comparison to filtering used, for example, in the vector median filter, as described in Hou, S., Luo, Y., and Kelamis, P., "Simultaneous sources separation via multi direction vector median filter," 79th Annual International Meeting, SEG, 2009, pp. 31-34, is that the energy from each pixel is split over the possible contributing shots rather than replaced with neighboring energy values. The approach provided herein as an aspect of the present embodiments takes into account that the sum of the energy contributions from the shots is to add to the energy value observed at this location. Also, the energy distributions of the neighboring points are considered rather than the simple median value, and combining information from a plurality of domains are also considered, thus enabling a more robust result.

In one embodiment, a coherence, as described above, is concurrently determined in two or more domains. Based on the described analysis, a processor may make the decision about a measure of coherence in a domain. In a further embodiment, a processor may make for each domain or for each mask a binary (yes or no) coherence decision. The processor, in a next act, collects all the binary coherence decisions and determines, for example, when in a majority of domains a coherence was determined, in a final decision if coherence was determined (yes or no).

A neighboring point to a first datapoint in a transform domain such as a CMP domain in accordance with one aspect of the present embodiments is a datapoint directly adjacent to the first datapoint on a relevant axis. No intermediate datapoints are present between the neighboring point and the first datapoint.

In accordance with a further aspect of the present embodiments, a neighborhood in a transform domain of the first datapoint is defined as a maximum range of intermediate datapoints between the first datapoint and a neighborhood datapoint.

In accordance with yet a further aspect of the present embodiments, the methods are applied to at least one datapoint in a neighborhood of a first datapoint, where the at least one datapoint is not a direct neighbor of the first datapoint.

A neighborhood of a first datapoint may be defined as a range of points that includes the direct neighbors of a datapoint as well as the datapoints with at most 1, 2, 3, 4, . . . n intermediate datapoints between a point in the neighborhood and the first datapoint.

As discussed above, multiple filter/layer-separation approaches are used in the literature to address blended seismic shot gathers. In the following, a method for signal separation using local energy and hyperbola fitting is provided.

Signal Separation Using Local Energy and Hyperbola Fitting

In this section, a filer/layer-separation approach is provided that uses both local image analysis and the hyperbolic nature of seismic recordings in the common midpoint (CMP) domain. These concepts are successfully used in the literature. That is, the vector median filter approach, such as described in Huo, S., Luo, Y., and Kelamis, P., "Simultaneous sources separation via multi-directional vector-median filter," 79th Annual International Meeting, SEG, 2009 pp. 31-34, the entire disclosure of which is incorporated by reference, uses local image structure, and the hyperbolic nature of seismic data is utilized in Radon transform based methods, such as described in, for example, Akerberg, P., Hampson, G., Rickett, J., Martin, H., and Cole, J., "Simultaneous source separation by sparse radon transform," 78th Annual International Meeting, SEG, 2008, pp. 2801-2805 and Spitz, S., Hampson, G., and Pica, A., "Simultaneous source separation: a prediction-subtraction approach," 78th Annual International Meeting, SEG, 2008, pp. 2811-2815, the entire disclosure of which is incorporated by reference.

In contrast to the above cited work, local image analysis is applied followed by hyperbola fitting to track the reflection of interest. In the local image, eigen analysis is performed based on the second moment matrix (e.g., as described in Chang et al. 2005) in the common midpoint (CMP) domain of the seismic data. Local structure descriptors such as orientation, energy, and isotropy that characterize each data point are obtained. A simple thresholding on the energy shows the interesting reflections and the interference. Edge linking may be performed based on the orientation to provide trace continuity in the thresholded image. Because the signals of interest have hyperbola patterns, each detected curve may be fitted with a hyperbola and the goodness of fit may be measured. For the interfering signal or noise, the fitting scores are low. Thus, the signal or noise may be removed from the image.

In above sections, approaches are provided for deblending seismic shot gathers that allow the use of conventional methods for the subsequent migration process to construct a seismic image. Next, a method is provided that directly uses blended data for migration.

Preconditioned Iterative Migration from Simultaneous Sources Using Bregman Iteration In this section, a method is provided to use blended data directly for migration. The advantage of this alternative approach is that model information may be used as prior information for the deblending process (e.g., as described in Berkhout, A. J., "Changing the mindset in seismic data acquisition," The Leading Edge, v. 27, no. 7, 2008, pp. 924-938). That is, the knowledge about the location of reflectors and the different velocities may help to predict and thus separate contributions from different shots.

A purpose is to optimize seismic image migration via the following cost functional $$m^* = \underset{\forall m}{\operatorname{argmin}} \|Lm - P_b\|_2^2 + \lambda R(m) \tag{2}$$

where m is the trial migrated image, $P_b$ is the measurement data, L is the forward modeling operator, $\lambda$ is the Lagrange multiplier, and R is the regularization operator. This equation seeks the optimal image m* that minimizes the least square data fidelity plus the regularization terms. Because the dimensionality of L is very large, Equation (2) may be solved using an iterative approach.

In the domain of medical imaging, reconstructing a high resolution image with few artifacts is of interest. The exact form of Equation (2) is used, with different interpretation that the operator L simulates an imaging process of a medical modality, such as CT or MRI, rather than a wave propagation process in seismic imaging. Nonetheless, the solution to Equation (2) follows the same mathematical derivation.

Introducing the Bregman iteration (BI) (e.g., see Chang et al. 2006) and a preconditioning weighting matrix (e.g., see Chang et al. 2007), Eq. 2 is reformulated in accordance with an aspect of the present embodiments as:

$$m_{k+1}^* = \underset{\forall m}{\operatorname{argmin}} \|W(Lm - P_b - v_k)\|_2^2 + \lambda R(m), \tag{3}$$

$$v_k = P_b + v_{k-1} - Lm_k^*$$

and $$v_0 = 0.$$

Here, again, m is a trial image, $\lambda$ is the Lagrange multiplier, $P_b$ is the measured data vector, W is a weighting matrix that may be optimally designed to accelerate convergence, and k is the index for Bregman iteration. The regularization term is implemented as the total variation of m.

Bregman iteration works as follows. The cost functional (2) is optimized via conjugate gradient (CG) method to obtain $m^*_1$. This is referred to as Bregman iteration 0. In Bregman iteration k>0, Equation (3) is minimized, again using CG to obtain an improved image $m^*_{k+1}$. This procedure continues until a stopping criterion is satisfied. The results obtained from Bregman iteration reveal finer details than those from conventional optimization techniques.

The weighting matrix is derived for near optimal convergence of the data fidelity term, since the data fidelity term may be the dominant part of the cost functional. With the solution $D=W^H W=(LL^H)^{-1}$, the data fidelity is expected to converge after the first CG iteration and given any initial image $m_0$.

In summary, different approaches have been provided herein as one or more aspects of the present embodiments to address interference in blended seismic shot gathers. The methods may be classified in deblending as preprocessing acts and blended data based migration. A first method may repeat shot/receiver combinations in different experiments and uses the resulting mutual shot signatures with MIA to separate the contributions of the different shots. A drawback of such a simple MIA approach is that the approach does not utilize the structure between signals of neighboring receivers. Thus, the use of parallel coherence in different input domains is provided as a second method in accordance with an aspect of the present embodiments (e.g., the CSG and CMP domains) to improve coherence based deblending. For layer-separation, local image analysis that takes the hyperbolic nature of seismic recordings in the common midpoint domain into account as a third method in accordance with an aspect of the present embodiments is used. Bergman iteration based migration is provided as a method applied directly on the blended seismic shot gathers. The knowledge of the model, such as location of reflectors and the different velocities, may help to predict and thus separate contributions from different shots.

Figure 9:
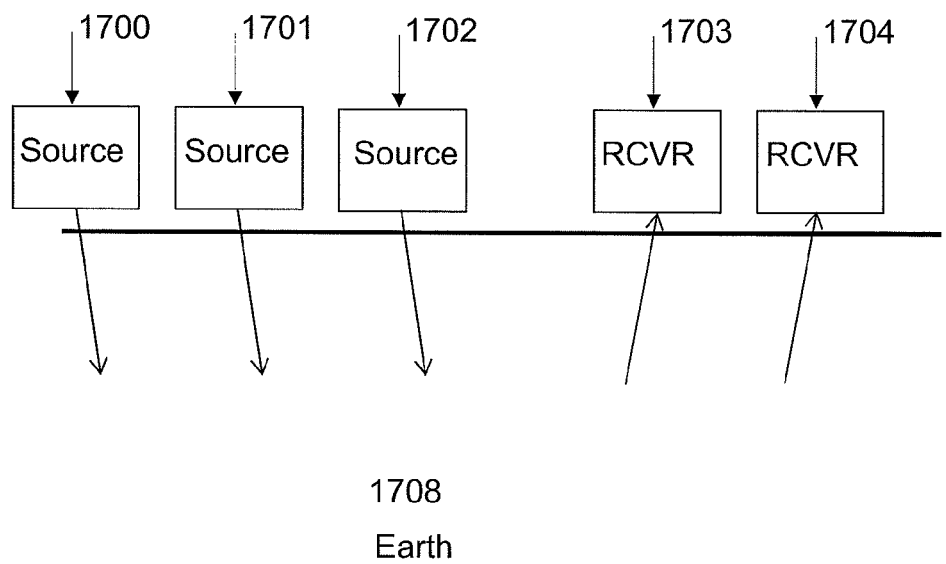
FIG. 9 illustrates one embodiment of a system for generating and receiving seismic data.

The methods, as provided herein, are, in one embodiment, implemented on a system or a computer device. FIG. 9 illustrates a system used in generating and receiving seismic data in accordance with an aspect of the present embodiments. Seismic signal generators 1700-1702 generate signals that are transmitted into the transmission medium 1708, which may be earth. Some of those signals are reflected back toward, for example, the surface of the earth and are received by the seismic signal receivers 1703-1704. The received signals may be stored on a data storage device and processed later by a processor. Alternatively, the received signals may be processed in real time by a processor that is then part of the system. Equipment illustrated in FIG. 9 is known.

Figure 10:
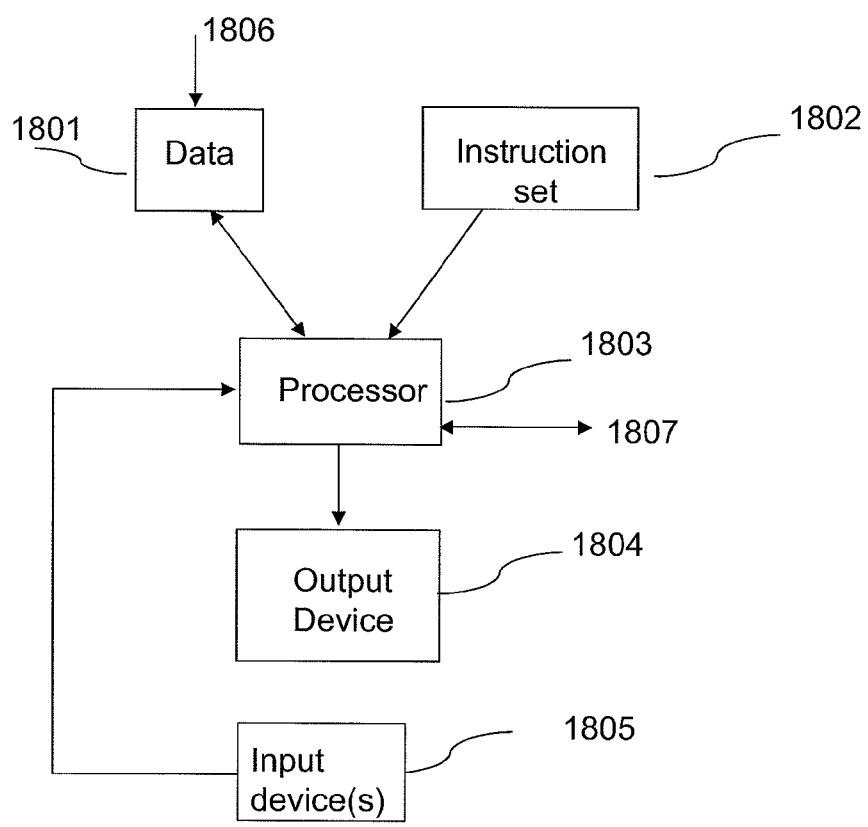
FIG. 10 illustrates a system in accordance with an aspect of the present embodiments for analyzing the seismic data generated by the system of FIG. 5 or by similar systems.

A system illustrated in FIG. 10 and as provided herein is enabled for receiving, processing and generating data. The system is provided with data that may be stored on a memory 1801. Data may be obtained from a sensor or may be provided from a data source. Data may be provided on an input 1806. Such data may be seismic data, which may be blended seismic data or any other image data. The data may be provided from memory that stores signals generated by the seismic receivers 1703-1704. Alternatively, the data may be collected directly from the seismic receivers 1703-1704 and processed as received. The processor is also provided or programmed with an instruction set or program executing the methods of the present embodiments. The instruction set is stored on a memory 1802 and is provided to the processor 1803, which executes the instructions of 1802 to process the data from 1801. Data, such as a seismic image or seismic image representation or any other signal resulting from the processor may be outputted on an output device 1804, which may be a display to display data or a data storage device. The processor also has a communication channel 1807 to receive external data from a communication device and to transmit data to an external device. The system in one embodiment has one or more input devices 1805, which may be a keyboard, a mouse or any other device that may generate data to be provided to processor 1803. The processor may be dedicated hardware. However, the processor may also be a CPU or any other computing device that may execute the instructions of 1802. Accordingly, the system, as illustrated in FIG. 10, provides a system for data processing resulting from a sensor or any other data source and is enabled to execute the acts of the methods, as provided herein, as an aspect of the present embodiments.

Thus, a system and methods have been described herein for deblending of seismic shot gathers and for processing blended data into a seismic image without deblending.

The following references provide background information generally related to the present embodiments, the disclosures of which are hereby incorporated by reference: Akerberg, P., Hampson, G., Rickett, J., Martin, H., and Cole, J., "Simultaneous source separation by sparse radon transform," 78th Annual International Meeting, SEG, 2008, pp. 2801-2805; Berkhout, A. J., "Changing the mindset in seismic data acquisition," The Leading Edge, v. 27, no. 7, 2008, pp. 924-938; Chang, T., He, L., and Fang, T., "Devices Systems and Methods for Processing Images," U.S. patent pending, application Ser. No. 11/539,985 (2007); Chang, T., Song J., Fang, T., and Speier, P., "Iterative Image Reconstruction for Magnetic Resonance Imaging," U.S. patent pending, application Ser. No. 11/926,912 (2008); Chang, T. and Tyan, J., "System and method for efficient feature estimation for medical images," U.S. patent pending, application Ser. No. 11/343,128 (2006); Claussen, H., Rosca, J., and Damper, R., "Generalized mutual interdependence analysis," International Conference on Acoustics, Speech and Signal Processing. Taipei, Taiwan, 2009, pp. 3317-3320; Claussen, H., Rosca, J., Damper, R., "Mutual features for robust identification and verification," International Conference on Acoustics, Speech and Signal Processing, Las Vegas, Nev., 2008, pp. 1849-1852; Claussen, H., Rosca, J., Damper, R., "Mutual interdependence analysis," Independent Component Analysis and Blind Signal Separation, Springer-Verlag, Heidelberg, Germany, 2007, pp. 446-453; Hampson, G., Stefani, J., and Herkenhoff, E. F., "Acquisition using simultaneous sources," The Leading Edge, v. 27, no. 7, 2008, pp. 918-923; Huo, S., Luo, Y., and Kelamis, P., "Simultaneous sources separation via multi-directional vector-median filter," 79th Annual International Meeting, SEG, 2009, pp. 31-34; and Spitz S., Hampson, G., and Pica, A., "Simultaneous source separation: a prediction-subtraction approach," 78th Annual International Meeting, SEG, 2008, pp. 2811-2815.

While fundamental novel features of the embodiments have been shown, described and pointed out, various omissions, substitutions, and changes in the form and details of the methods and systems illustrated and in operation of the system may be made by those skilled in the art without departing from the spirit of the invention. It is the intention, therefore, that the invention be limited only as indicated by the scope of the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. A method for deblending seismic data, the method comprising:
   acquiring, with a processor, blended seismic data in a plurality of recordings from a plurality of sensors, each sensor of the plurality of sensors generating a plurality of blended signals generated by a plurality of semi-simultaneously fired sources, wherein each source of the plurality of semi-simultaneously fired sources is fired more than once;
   selecting, with the processor, a first source from the plurality of semi-simultaneously fired sources and a plurality of blended signals received by a first sensor;
   arranging, with the processor, recordings of the plurality of blended signals received by the first sensor to align with a timing of the first source; and
   applying, with the processor, Mutual Interdependence Analysis (MIA) to estimate from at least two aligned blended signals a deblended signal received at the first sensor and attributed to the first source.

2. The method of claim 1, further comprising:
   arranging recordings of a plurality of blended signals acquired by a second sensor to align with the timing of the first source.

3. The method of claim 2, further comprising:
   arranging recordings of the plurality of blended signals received by the first sensor to align with a timing of a second source.

4. The method of claim 1, further comprising:
   generating a seismic image based on the estimated deblended signal.

5. The method of claim 1, wherein the method is applied in oil exploration.

6. The method of claim 1, wherein the method is applied in gas exploration.

7. The method of claim 1, wherein applying Mutual Interdependence Analysis comprises evaluating an expression:

$$\hat{s}_{n,m} = X_m \cdot (X_m^T \cdot X_m)^{-1} \cdot r_{n,m},$$

with $$X_m = \lfloor x_{1,m}, x_{2,m}, \ldots, x_{E,m} \rfloor$$

and $$r_{n,m}(e) = \begin{cases} 1 & \text{if } x_m = \sum_{i=1}^{N} \alpha_i \cdot s_i \text{ and } \alpha_n = 1 \\ 0 & \text{else} \end{cases}$$

wherein $\hat{s}_{n,m}$ is estimated deblended data from source n at sensor m, $X_m$ is a collection of recordings at sensor m from all experiments, $r_{n,m}(e)$ is a vector that indicates which of the experiments contain an aligned target source e, n indicates a source, m indicates a sensor, $\alpha_i$ is a weight of a single shot recording i in a recording of the currently analyzed sensor $x_m$, and $s_i$ is a single shot recordings of shot locations i.

8. A method for deblending blended seismic data, the method comprising:
   acquiring, with a processor, blended seismic data in a plurality of recordings from a plurality of sensors, each sensor of the plurality of sensors receiving a blended signal generated by at least a first semi-simultaneous source and a second semi-simultaneous source and the processor recording a plurality of datapoints, each datapoint of the plurality of datapoints being associated with a respective sensor of the plurality of sensors at a specific time;
   arranging, with the processor, each datapoint of the plurality of datapoints in a plurality of transformed recordings in accordance with a timing and a location of each source of the first semi-simultaneous source and the second semi-simultaneous source in at least one transform domain;
   selecting, with the processor, a datapoint associated with a first time at a first sensor of the plurality of sensors;
   determining, with the processor, an energy histogram of a plurality of datapoints that neighbor the selected datapoint in the at least one transform domain as a result of the first semi-simultaneous source;
   determining, with the processor, an energy histogram of a plurality of datapoints that neighbor the selected datapoint in the at least one transform domain as a result of the second semi-simultaneous source; and
   estimating, with the processor, an energy contribution of the first semi-simultaneous source to the selected datapoint relative to the second semi-simultaneous source.

9. The method of claim 8, further comprising:
   estimating, with the processor, an energy contribution of the first semi-simultaneous source at the selected datapoint relative to all contributing semi-simultaneous sources.

10. The method of claim 8, further comprising:
    selecting, with the processor, at least one datapoint in a neighborhood of the selected datapoint in the at least one transform domain;
    determining an energy contribution of the first semi-simultaneous source to the at least one selected datapoint relative to the second semi-simultaneous source.

11. The method of claim 8, further comprising:
    estimating, with the processor, an energy contribution of the first semi-simultaneous source to each datapoint of a plurality of datapoints associated with the plurality of sensors relative to all contributing semi-simultaneous sources.

12. The method of claim 10, further comprising displaying estimated energy contribution of the first semi-simultaneous source to each datapoint of a plurality of datapoints associated with the first sensor as deblended datapoints.

13. The method of claim 8, wherein an energy contribution of the first semi-simultaneous source and the second semi-simultaneous source is defined by a probability constraint.

14. The method of claim 8, further comprising:
    arranging, with the processor, each datapoint of the plurality of datapoints in the plurality of transformed recordings in accordance with a timing and a location of each source of the first semi-simultaneous source and the second semi-simultaneous source in at least one additional transform domain.

15. The method of claim 8, wherein a transform domain is selected from the group consisting of Common Shot Gather, Common Mid Point Gather, Common Offset Gather and Common Detector Gather.

16. The method of claim 8, wherein the method is applied in exploration for natural resources.

17. A method for deblending blended seismic data, the method comprising:
    acquiring, with a processor, data of a blended seismic data in a plurality of recordings from a plurality of sensors;

each sensor of the plurality of sensors receiving a blended signal generated by a plurality of semi-simultaneous sources;

arranging, with the processor, a recording related to a first sensor of the plurality of sensors in a Common Midpoint (CMP) domain representation;

detecting, with the processor, an edge in the CMP domain representation, the detecting comprising applying a second moment eigen analysis followed by thresholding;

parameterizing, with the processor, the edge, the parameterizing comprising hyperbolic equation fitting; and estimating, with the processor, a deblended signal received at the first sensor and attributed to a first source of the plurality of semi-simultaneous sources based on a measure of hyperbolic equation fitting of the edge.

18. The method of claim 17, wherein the estimated deblended signal is created by removing data determined not to fit a hyperbolic equation.

19. The method of claim 17, further comprising:
generating a seismic image based on the estimated deblended signal.

20. The method of claim 17, wherein the method is applied in exploration for natural resources.

* * * * *